(12) United States Patent
Koevoets

(10) Patent No.: US 10,837,152 B2
(45) Date of Patent: Nov. 17, 2020

(54) METHODS AND SYSTEM FOR FORMING RECLAMATION STRUCTURES

(71) Applicant: IHC Holland IE B.V., Sliedrecht (NL)

(72) Inventor: Adrianus Josephus Petrus Marie Koevoets, Klein Zundert (NL)

(73) Assignee: IHC Holland IE B.V., Sliedrecht (NL)

( * ) Notice: Subject to any disclaimer, the term of this patent is extended or adjusted under 35 U.S.C. 154(b) by 0 days.

(21) Appl. No.: 15/760,630

(22) PCT Filed: Sep. 16, 2016

(86) PCT No.: PCT/NL2016/050637
§ 371 (c)(1),
(2) Date: Mar. 16, 2018

(87) PCT Pub. No.: WO2017/048123
PCT Pub. Date: Mar. 23, 2017

(65) Prior Publication Data
US 2019/0040600 A1 Feb. 7, 2019

(30) Foreign Application Priority Data
Sep. 18, 2015 (NL) .................................. 2015462

(51) Int. Cl.
| | |
|---|---|
| *E02D 3/12* | (2006.01) |
| *E02F 7/06* | (2006.01) |
| *C04B 28/00* | (2006.01) |
| *E02F 5/30* | (2006.01) |
| *C04B 28/02* | (2006.01) |
| *C04B 28/08* | (2006.01) |

(Continued)

(52) U.S. Cl.
CPC .............. *E02D 3/12* (2013.01); *C04B 28/006* (2013.01); *C04B 28/021* (2013.01); *C04B 28/08* (2013.01); *E02F 5/30* (2013.01); *E02F 7/06* (2013.01); *E02F 7/065* (2013.01); *C04B 2111/00137* (2013.01); *C04B 2111/00482* (2013.01); *C04B 2111/74* (2013.01); *Y02P 40/165* (2015.11); *Y02W 30/92* (2015.05); *Y02W 30/94* (2015.05)

(58) Field of Classification Search
CPC combination set(s) only.
See application file for complete search history.

(56) References Cited

U.S. PATENT DOCUMENTS

| | | | | |
|---|---|---|---|---|
| 4,465,518 A | * | 8/1984 | Miyoshi ................ | C04B 18/141 106/715 |
| 6,299,380 B1 | * | 10/2001 | Bracegirdle ........ | B01F 13/0035 209/10 |

(Continued)

FOREIGN PATENT DOCUMENTS

| | | |
|---|---|---|
| EP | 0500199 A2 | 8/1992 |
| JP | 2000345577 A | 12/2000 |
| JP | 2002128550 A | 5/2002 |

(Continued)

*Primary Examiner* — Kyle Armstrong
(74) *Attorney, Agent, or Firm* — N.V. Nederlandsch Octrooibureau; Catherine A. Shultz; Katelyn J. Bernier

(57) ABSTRACT

A method of forming a structure includes a) excavating a material; b) homogenizing the material; c) ensuring aluminosilicate levels in the material; d) increasing alkaline levels of the material; e) foaming the material; and f) injecting the material onto a surface, wherein the material forms into a foam-like structure when injected.

16 Claims, 2 Drawing Sheets

(51) Int. Cl.
 *C04B 111/00* (2006.01)
 *C04B 111/74* (2006.01)

(56) References Cited

U.S. PATENT DOCUMENTS

2008/0210135 A1* 9/2008 van der Zon ......... C04B 18/021
 106/676
2018/0050946 A1* 2/2018 Corazza ................ B09B 3/0041

FOREIGN PATENT DOCUMENTS

| JP | 2012240903 A | 12/2012 |
| WO | 9851760 A2 | 11/1998 |
| WO | 2002074391 A1 | 9/2002 |
| WO | 2005075373 A1 | 8/2005 |
| WO | 2013048236 A1 | 4/2013 |

* cited by examiner

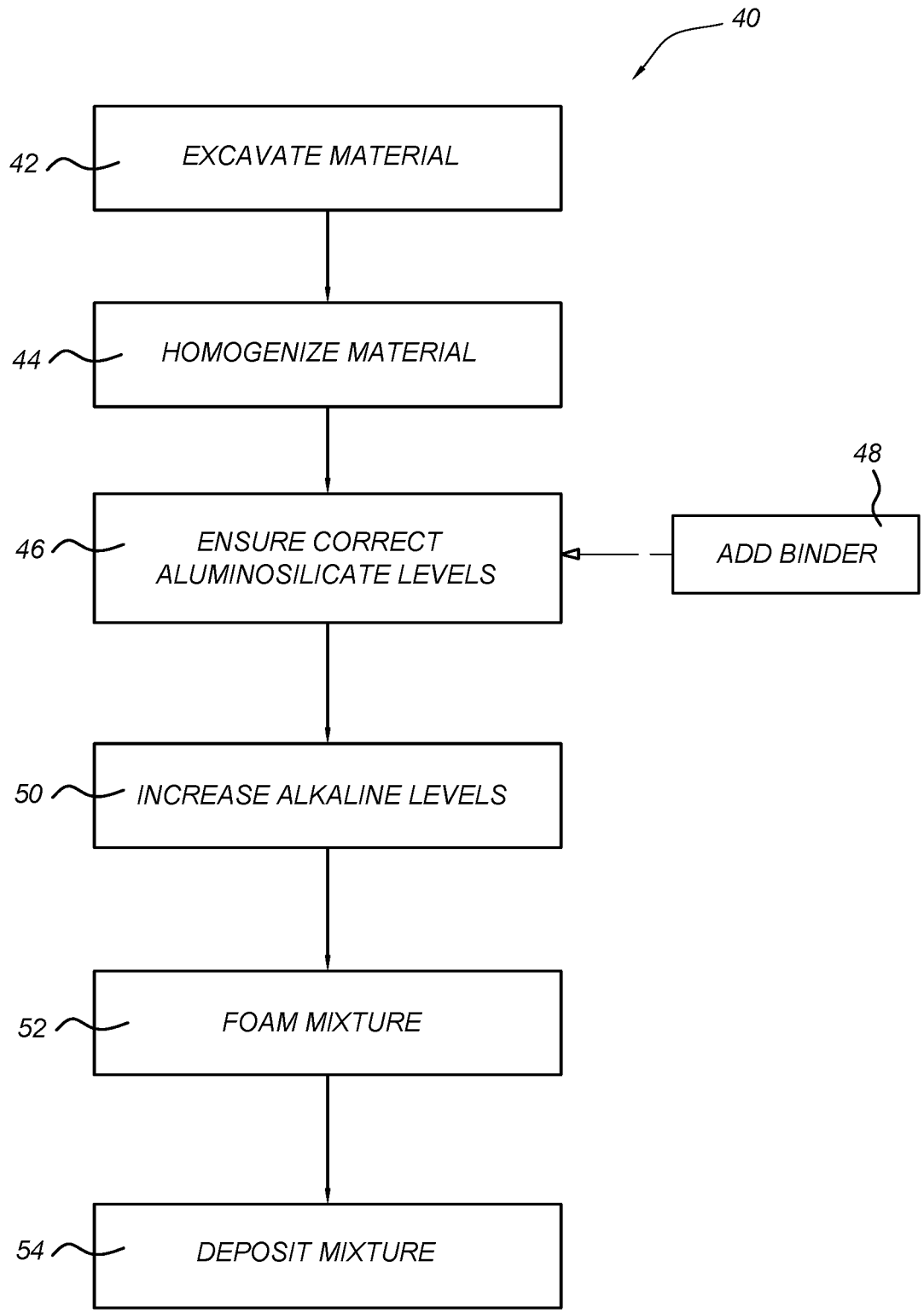

METHODS AND SYSTEM FOR FORMING RECLAMATION STRUCTURES

In dredging land reclamation, dredged aggregates are typically dredged, transported to a new location and then piled by dumping or other means to form the new land. The volume, stability and erosion properties of the newly built land is subject to the size and density of the applied mass forming the new land. A level of protection can be added by adding natural stone or other techniques to increase the density, for example, applying vibrations. The size of the reclaimed land is equal to the applied mass of dredged aggregates, and therefore also proportional to the capacity of the transport which the dredged aggregates travel to the reclamation site.

The typical material used for land reclamation is sand. As reclamation sand is a scarce commodity in many parts of the world, it often must be mined from elsewhere and transported to the new location. This can result in high transportation costs and adverse environmental effects for areas from which the sand is dredged.

SUMMARY

According to a first aspect of the invention, a method of forming a structure comprises a) excavating a material; b) homogenizing the material; c) ensuring aluminosilicate levels in the material; d) increasing alkaline levels of the material; e) foaming the material; and f) injecting the material onto a surface, wherein the material forms into a foam-like structure when injected.

Such a method allows for forming a structure with dredged material that is not limited by the capacity of the transport vessel (or other means) holding the dredged material. This can also reduce transport costs required and enable use of local materials. Because the method allows for forming the structure with material which forms into a foam-like structure, the formed structure can expand to be larger than the volume of material dredged (and transported). Such a method also allows for use of materials that were previously thought unsuitable for land reclamation, such as clay or clay mixtures, to form a stable structure.

According to an embodiment, step b) further comprises analyzing the water content of the mixture; and adjusting water levels for the mixture by adding or eliminating water from the mixture.

According to an embodiment, step d) comprises adding an alkaline material. Proper alkaline levels ensure that aluminosilicates are dissolved into the mixture to allow for proper foaming.

According to an embodiment, step c) comprises adding a binder material to the mixture. Optionally, the binder material comprises fly ashes, blast furnace slag, calcined clays, waste glass, waste stone and/or rock wool. Adding a binder can be used to adjust the levels of aluminosilicates in the mixture to enable the desired structure to be formed from the method.

According to an embodiment, one or more of steps b)-e) are performed in one or more mixing chambers.

According to an embodiment, one or more steps of the method are performed using a dosing system. Optionally, the dosing system could include one or more nozzles. Such a dosing system could help ensure that precise amounts of different materials are added to ensure a desired mixture.

According to an embodiment, step f) comprises injecting the material using an injection mouth. An injection mouth can help direct the material to a desired placement area and/or surface.

According to an embodiment, the material is injected onto a subsea surface. Thus, the method can be useful in land reclamation and/or building subsea structures.

According to an embodiment, the foam-like structure solidifies once injected.

According to an embodiment, the foam-like structure is designed to form in a certain time period based on the pressure at which the structure is formed, materials used and/or other factors. This can ensure proper settling and curing, no matter the injection surface.

According to an embodiment, step e) comprises mechanically mixing air into the material. This can be done in a mixer and/or using nozzles to inject air into the material.

According to an embodiment, step e) comprises pressurizing the material and adding compressed air to the material. Such pressurizing and adding compressed air brings the pressurized material to a higher pressure than the environment in which it will be injected. Once injected, the pressurized material expands to form the rigid foam-like structure.

According to an embodiment, step e) comprises adding a foaming agent into the material. A foaming agent can be, for example, hydrogen peroxide, which acts as an additional catalyst to decompose the hydrogen peroxide into water and oxygen. In that case, a catalytic ignitor would also be used to ignite a chemical reaction.

According to an embodiment, step e) comprises adding a metal powder to the material. The metal powder can trigger an exothermic reaction, causing organic containment or the metal powder to create expanding gas bubbles inside the mixture. Optionally, a catalytic ignition agent could also be used with the metal powder to further control the reaction and foaming.

According to an embodiment, step a) comprises dredging a material.

According to a second aspect of the invention, a reclamation system comprises means for excavating a material; a mixing system for forming a mixture with the material, the mixing system further being able to homogenize the mixture, ensure correct aluminosilicate levels in the mixture, and/or increase alkaline levels in the mixture; and an injection system for injecting the mixture onto a surface, wherein the mixture will form into a foam-like structure once injected. Such a reclamation system can allow for using local materials to form a stable structure that can be larger in volume than the volume of materials excavated.

According to an embodiment, the injection system comprises an injection tube with an injection mouth for injecting the mixture onto a surface. The injection tube with an injection mouth can ensure the materials are injected in a controlled manner to form the desired structure.

According to an embodiment, the injection system further comprises means for mechanically mixing air into the mixture, means for adding a foaming agent into the mixture, means for adding a metal powder and a catalytic ignitor and/or means for pressurizing the mixture and adding compressed air into the mixture. Optionally, the means for mechanically mixing air into the mixture, means for adding a foaming agent into the mixture, means for adding a metal powder and a catalytic ignitor and/or means for pressurizing the mixture and adding compressed air into the mixture comprises one or more mixing chambers.

According to an embodiment, the means for excavating a material is a vessel. Optionally, the vessel is a dredger.

According to an embodiment, the mixing system comprises an analysis system to analyze the content of the mixture. Optionally, the analysis system further comprises a system for adjusting water levels of the mixture. Further optionally, the analysis system can continuously detect and/or adjust the levels of water, material, binder, and/or other additives in the mixture.

According to an embodiment, the system further comprises a dosing system for injecting the material, binder, water and/or other additives into the mixing system. A dosing system could include one or more nozzles. The dosing system can ensure precise and correct amounts of components are added to the mixture for proper structure formation.

According to an embodiment, the mixing system ensures correct alkaline levels in the mixture by adding an alkaline material. Ensuring correct alkaline levels ensures proper chemical reactions can take place for desired foaming and structure formation.

According to an embodiment, the mixing system ensures correct aluminosilicate levels in the mixture by adding a binder. Optionally, the binder comprises fly ashes, blast furnace slag, calcined clays, waste glass, waste stone and/or rock wool.

According to an embodiment, the mixture solidifies into the foam-like structure once injected. This solidification can be designed to take place in a certain time period based on the materials used, the pressure of the injection area, etc. This allows for the formation of a solid structure.

BRIEF DESCRIPTION OF THE DRAWINGS

FIG. 2 shows a schematic depiction of a method for forming a structure.

DETAILED DESCRIPTION

Figure 1:
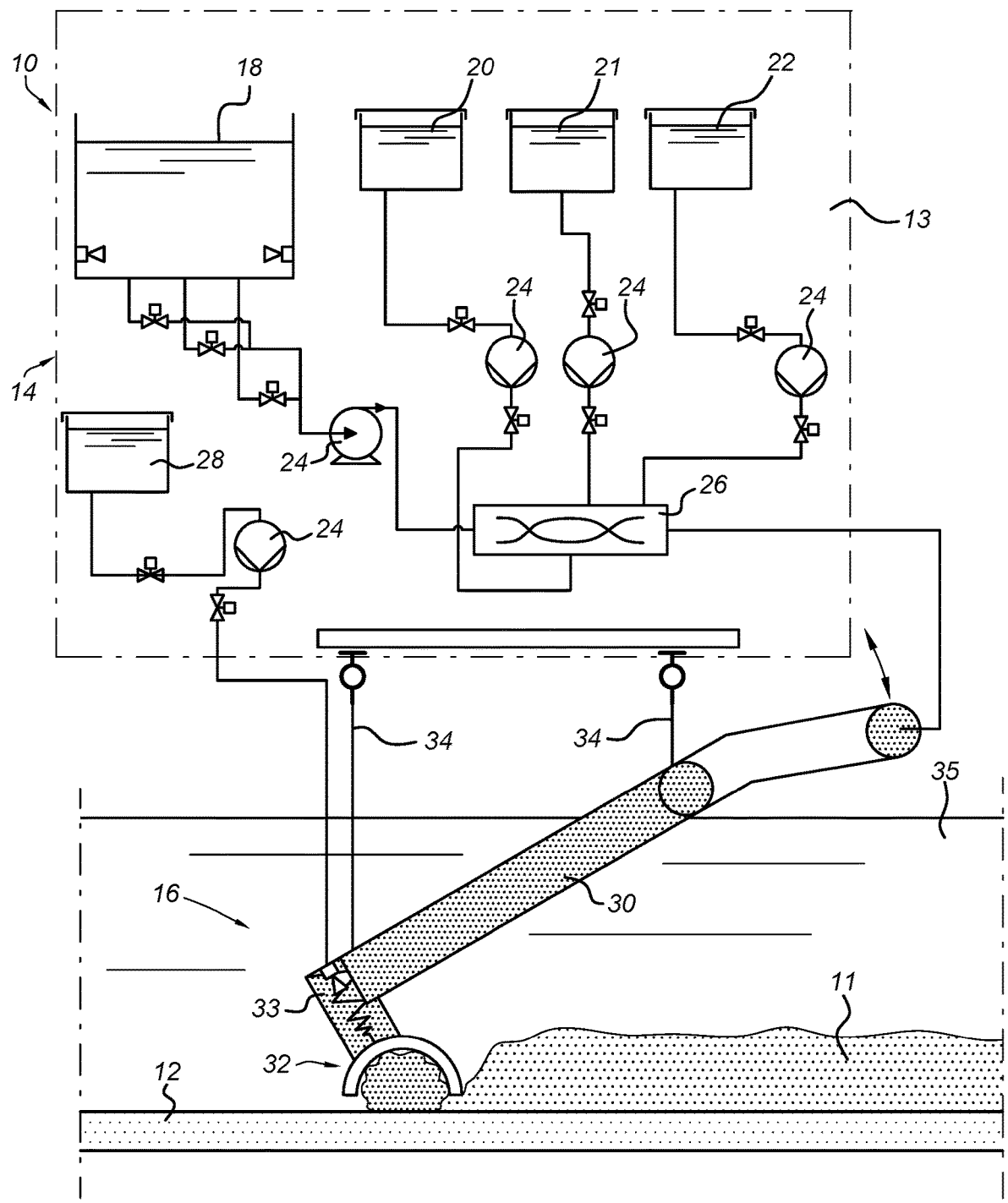
FIG. 1 shows a schematic view of a foaming reclamation system.

FIG. 1 shows a schematic view of foaming reclamation system 10 depositing a reclamation structure 11 on seabed 12. Foaming reclamation system 10 includes vessel 13, mixing system 14 and injection system 16. Mixing system 14 includes hopper 18, binder storage tank 20, foaming agent storage tank 21, other additive storage tank 22, pumps 24 and mixer 26. Injection system 16 includes catalytic ignitor tank 28 (with pump 24), injection tube 30 with injection mouth 32 and mixing chamber 33. Injection tube 30 is connected to hoisting arrangement 34 for positioning and control within sea 35. Vessel 13 can be a dredger or another type of vessel.

Mixer 26 can also have, for example, one or more stirrers, nozzles and/or other devices or components to ensure proper adding and mixture of components. Nozzles could be used for adding air to the mixture, which will be discussed in more detail in relation to foaming.

Mixing system 14 is located on vessel 13. Hopper 18, binder storage tank 20, foaming agent storage tank 21, and other additive storage tank 22 each connect to mixer 26. Pumps 24 pump each of the excavated mixture, binder, foaming agent and/or any other additives to mixer 26. Injection tube 30 is also connected to vessel 13 through hoisting arrangement 34. Catalytic ignitor tank 28 is connected to injection tube 30 to send catalytic ignitor to injection tube 30 using pump 24. Injection mouth 32 is connected to the end of injection tube 30. Alternatively, tank 28 could store foaming agent, adding it to the mixture in injection system 16 after mixture has been mixed, and possibly has went through a settling period.

In operation, material, such as clay material or a clay material mix, is excavated or dredged, typically locally from a sea bed or other location, as shown by step 42 of method 40. The excavation can be done by dredging vessel 13, another vessel, or another means of excavating. Once excavated, material is stored in hopper 18. Vessel 13 can then travel to the location where land reclamation is desired. Alternatively, the material could be directly processed instead of stored.

Once collected, the dredged material is then homogenized as shown by step 44. This step can include adjusting the water levels in the mixture if required, and can include dewatering into a consistent mixture or in some cases adding water. Mixing system 14 can include an analysis system for analyzing the content of the dredged material in hopper 18, including the water content. The analysis system can also be used to determine how much (if any) binder or other materials should be added to the mixture with the dredged materials. Typically, the desired mixture includes a dry mass content between 40% and 60%.

Next, shown by step 46, the aluminosilicate levels of the mixture are checked and adjusted if needed. Typically, a particular ratio of silicate to aluminum is defined for the structure to be made. For example, this ratio can be between about 1 and 3 for a rigid 3D structure. The aluminosilicate levels of the mixture can be increased by adding a binder, as shown by optional step 48. The binder used can be, for example, fly ashes, blast furnace slag, calcined clays, waste glass, waste stone, rock wool, etc., which can be stored in binder storage tank 20.

Next, the alkaline levels of the mixture must be controlled (step 50). Typically, the alkaline level is raised to a level, between or equal to about 4 to 14 M mixture. Alkaline levels can be controlled, for example, by adding sodium hydroxides, potassium hydroxides or equivalents, which could be stored in other additives storage tank 22. These alkaline levels ensure that the aluminosilicates are dissolved into the mixture.

Binder, dredged material, water and/or other additives may be introduced to mixer 26 using a dosing system so that very precise amounts are added. The amounts and ratios of materials depend on a variety of factors, including but not limited to the content of the dredged material; the specific additives used; and the water content, temperature and pressure of the liquid where the mixture is to be injected. The analysis system of mixing system 14 can continuously monitor contents of the mixture and adjust levels of inputs throughout to ensure a precise and consistent mixture.

The dredged material is solidified using alkali-activated polycondensation of the reactive aluminosilicate fraction of materials added to the dredged material as a binder. The polycondensation material is chemically described by formula:

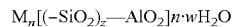

During the solidification process a gel phase exists in which the consistency of the mixture possesses the coherence and thixotropic behavior to contain gas bubbles in the mixture. When further solidified, the entrapped bubbles create a foam-like structure, reducing the material volume ratio of the solid material created. The foaming of the mixture (step 52) can be done in a number of different ways:

Mechanically mixing air into the gel-like mixture. This would generally be done in mixer 26, and could involve nozzles and/or one or more stirrers to introduce air and mix it into the mixture.

Pressurizing the mixture and adding compressed air to bring the mixture to a higher pressure than the surrounding pressure of the environment in which it is to be injected. When the pressurized mixture is released into the lower pressure environment, the trapped air in the mixture will expand and create a porous foam-like structure. The adding of compressed air and pressurizing of the mixture could be done in mixing tank 26, and could involve nozzles and/or pressurization system connected to mixer 26.

Using a chemical agent as a foaming agent, for example, using hydrogen peroxide as an additional catalyst to decompose the hydrogen peroxide into water and oxygen. A catalytic ignitor can then be added from catalytic ignitor tank 28 to ignite a chemical reaction that will produce the necessary gas for creating a porous foam-like structure. The foaming agent could be stored in foaming agent storage tank 21 and added to mixing tank 26. Alternatively, the foaming agent could be stored in a tank similar to tank 28 and added after the mixture has been mixed and possible settled in mixer 26.

Adding a metal powder to the mixture and possibly adding a catalytic ignitor. The catalytic ignitor can be, for example, aluminum or zinc (including powders), and can be used to trigger an exothermic reaction in the mixture, causing either the organic containment or the metal powder to create expanding gas bubbles inside the mixture, forming into a foam-like structure. The metal powder could be stored in other additive storage tank 22 and mixed in mixer 26. Alternatively, only metal powder could be used (without the catalytic ignitor) when precise control of the foaming process is not required, such as for large structures that do not require a very specific shape.

The mixture can be deposited on the seabed 12 using injection system 16 (step 54). If desired, a mould can be used to shape the deposited mixture. The mixture will set into an amorphous solid mixture 11, with the compressive strength being directly related to a number of factors, including but not limited to: the water to dry matter ratio of the mixture, alkaline levels present in the process, the binder to aggregate ratio in the mixture, temperature of the curing process, and saline conditions of the environment in which the mixture is cured or the aggregate is dredged. Organic components of the dredged mixture may also cause porosity of the end product and reduce durability and compressive strength.

Injection system 16 can be used in a number of different ways depending on which method is used to foam the mixture. Injection tube 30 can be lowered with hoisting system 34 to direct injection mouth 32 at the location where land reclamation will start. Mixture can be sent from mixer 26 through injection tube 30. Injection tube 30 can include a mixing chamber 33, where a catalytic ignitor from catalytic ignitor tank 28 and/or in some cases a chemical foaming agent is added.

Alternatively, the mixture may go directly from mixer 26 to injection mouth 32 without additions from tank 28 or mixing from mixing chamber 33, for example when air has been mechanically beaten into the gel-like mixture in mixer 26; the mixture has been pressurized and had compressed air added in mixer 26; or foaming agent has been added and mixed into the mixture in mixer 26. In further embodiments, foaming agent, metal powder, etc. could be injected and mixed in mixing chamber 22 and/or mixing chamber 33 could be used for mechanically beating air into the mixture or adding compressed air and pressurizing the mixture.

The mixture is then injected onto sea bed 12 through injection mouth 32. As the mixture is being injected onto sea bed 12, more material, binder, other agents and/or water can be added to mixer 26 to form more material for injection.

After injection, the mixture will form a second stage volume 11 before it solidifies. The proper ratios and mixing of components ensure that solidification can take place before the liquid pressure is able to deflate it. This solidification can take place, for example, in less than twenty minutes, but could take up to 48 hours, and total curing may continue for months. The resulting structure 11 can have, for example, a density of around 1250 kg/m$^3$. In some embodiments, glass or equivalent microspheres can be added to the mixture in mixer 26, which can improve foaming. These microspheres would then disintegrate during expansion as a result of the elevated temperatures.

In a specific example, harbor silt was obtained through dredging operations. The dredged mixture contained approximately 13% organic matter and is first homogenized. Binder is then provided by mixing in a Kaolin clay mixture, making a mixture of about 32-38% dry matter and 62-68% water. This resulted in correct aluminosilicate and alkaline levels (8 M solution) for the mixture. The material was then foamed by adding aluminum powder of about 1 to 3% of the solid mass of the mixture. The aluminum powder reacted in the alkaline environment and formed the mixture into a foam-like structure.

Foaming reclamation system 10 allows for the use of locally dredged material to form reclaimed land 11 that is not limited by the capacity of the transport vessel, thereby reducing the costs and the volume of material needed to form reclaimed land. As previously mentioned, reclaimed land is normally formed by transporting sand to the desired location and dumping it to form the reclaimed land. In areas where sand is not readily available and must be transported from elsewhere, this makes land reclamation very costly. Additionally, previous systems did not use all materials for land reclamation, particularly clay or clay mixtures, as it was thought to have mechanical instability and an unsuitable texture for land reclamation.

Foaming reclamation system 10 allows for use of a variety of dredged materials, including clay and clay mixtures, for land reclamation. Using foam reclamation system 10, the large volume of material needed for land reclamation can be formed without the high transportation costs of past systems. This is both due to the ability to use local materials (for example, clay) to reduce transport costs, and due to the ability to expand the mixture into a higher volume rigid structure by producing a foam-like material and ensuring that it solidifies before it deflates. Therefore, the land mass is no longer limited by the capacity of the transport vessel 13. For example, clay material that was excavated can have a typical density of 2400 kg/m$^3$. The reclaimed land structure 11 formed by foam reclamation system 10 can have a density of about 1250 kg/m$^3$. In past systems, the normal transport weight to volume ration was 1:1. Using foam reclamation system 10, the transport weight to volume ratio is about 0.625:1. Thus, using foam reclamation system, the same volume of land can be formed with about 40% less clay material than previously needed, decreasing transport and excavation costs. This can also greatly decrease adverse environmental impacts both of the need to mine a large amount of material for land reclamation and the adverse environmental impacts associated with the transport of the material long distances.

In an alternative embodiment, the dredged material may be material in which chemical or thermal activation of the aluminosilicate fraction is already present in the dredged material. Thus, step 48 of adding binder to the mixture is not necessary. The dredged material can be used as the main binder source for the polymerization, and no additional binder needs to be added. This is typical when the dredged material is from (treated) mine tailings and waste sludges. The aluminosilicates are often present as a natural (re)source in such dredged materials.

While vessel 12 is shown in FIG. 1 as the means for excavating material, such as clay, other means could be used. For example, other dredging or excavating means, such as a backhoe, or other vessels could be used, such as a pontoon. In addition, these other means for excavating could also be used to inject the mixture to form the structure.

While system 10 is shown with a plurality of storage tanks 20, 21, 22, 28, some systems 10 would not include one or more of these. For example, in systems where no catalytic ignitor is added and the foam-like structure is instead formed by mechanically mixing air into the gel-like mixture, the catalytic ignitor tank 28 may not be present. Similarly, in systems 10 where the material dredged is high in naturally occurring aluminosilicate levels, binder may not be needed and binder storage tank 20 may not be a part of system 10. Conversely, in systems where more additives are injected into the mixture, for example, water, binder, metal powder and a catalytic ignitor, more tanks could be present in the system.

While steps of the method are shown and described in a specific order, steps can be performed in a different order and/or some steps may be performed simultaneously. Alternately, some steps may be omitted in some situations depending on the desired method of foaming and/or the material used.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A method of forming a structure, the method comprising:
   a) excavating a material;
   b) homogenizing the material;
   c) ensuring aluminosilicate levels in the material;
   d) increasing alkaline levels of the material;
   e) foaming the material; and
   f) injecting the material through a mouth of an injection tube, the mouth submerged under water so that the material is injected through the water to settle onto a surface that is under water, wherein the material forms into a foam-like structure and solidifies under water when injected.

2. The method of claim 1, wherein step b) further comprises:
   analyzing the water content of the mixture; and
   adjusting water levels for the mixture by adding or eliminating water from the mixture.

3. The method of claim 1, wherein step d) comprises adding an alkaline material.

4. The method of any of claim 1, wherein step c) comprises adding a binder material to the mixture.

5. The method of claim 4, wherein the binder material comprises fly ashes, blast furnace slag, calcined clays, waste glass, waste stone and/or rock wool.

6. The method of claim 1, wherein one or more steps of the method are performed using a dosing system.

7. The method of claim 1, wherein step e) comprises:
   mechanically mixing air into the material or pressurizing the material and adding compressed air to the material.

8. The method of claim 1, wherein step e) comprises:
   adding a foaming agent into the material.

9. The method of claim 1, wherein step e) comprises:
   adding a metal powder to the material.

10. The method of claim 8, and further comprising:
    adding a catalytic ignition agent to the material.

11. A reclamation system comprising:
    means for excavating a material;
    a mixing system for forming a mixture with the material, the mixing system further able to homogenize the mixture, ensure correct aluminosilicate levels in the mixture, and/or increase alkaline levels in the mixture; and
    an injection system comprising an injection tube with an injection mouth, wherein the injection mouth is submerged under water for injecting the mixture under water onto a surface that is under water, wherein the mixture forms into a foam-like structure and solidifies under water once injected.

12. The reclamation system of claim 11, wherein the injection system further comprises means for mechanically mixing air into the mixture, means for adding a foaming agent into the mixture, means for adding a metal powder and a catalytic ignitor and/or means for pressurizing the mixture and adding compressed air into the mixture.

13. The reclamation system of claim 11, wherein the mixing system comprises an analysis system to analyze the content of the mixture and/or adjust water levels of the mixture.

14. The reclamation system of claim 13, wherein the analysis system can continuously detect and/or adjust the levels of water, material, binder, metal powder, foaming agent and/or other additives in the mixture.

15. The reclamation system of claim 11, and further comprising a dosing system for injecting the material, binder, metal powder, foaming agent, water and/or other additives into the mixing system.

16. The reclamation system of claim 11, wherein the mixing system ensures correct alkaline levels in the mixture by adding an alkaline material and ensures correct aluminosilicate levels in the mixture by adding a binder.

* * * * *